Oct. 28, 1952      E. N. PHILLIPS      2,615,958

IMPEDANCE-MATCHING AND STANDING-WAVE-RATIO MEASURING SYSTEM

Filed Oct. 20, 1949      2 SHEETS—SHEET 1

EDWIN N. PHILLIPS
INVENTOR.

BY John J. Rogan
ATTORNEY

Oct. 28, 1952 E. N. PHILLIPS 2,615,958
IMPEDANCE-MATCHING AND STANDING-WAVE-RATIO MEASURING SYSTEM
Filed Oct. 20, 1949 2 SHEETS—SHEET 2

EDWIN N. PHILLIPS
INVENTOR.

BY John J Rogan
ATTORNEY

UNITED STATES PATENT OFFICE 2,615,958

IMPEDANCE-MATCHING AND STANDING-WAVE-RATIO MEASURING SYSTEM

Edwin N. Phillips, Cedar Rapids, Iowa, assignor to Collins Radio Company, Cedar Rapids, Iowa, a corporation of Iowa Application October 20, 1949, Serial No. 122,428

16 Claims. (Cl. 175—183)

This invention relates to high frequency transmission systems, and more particularly to arrangements using the phenomenon of standing waves to determine impedance relations in such systems.

Heretofore, in measuring the voltage standing wave ratio on a high frequency transmission line, it has been the practice to employ a radio frequency probe which is movable along the line to determine the location of voltage nodes and voltage maxima. Thus in the case of ultra high frequency wave transmission lines of the wave guide type, it has been necessary to provide a slot in the line wall through which the probe passes, the slot being provided in order to enable the probe to be moved along the length of the line. Since the inwardly projecting part of the probe itself offers impedance within the line, it has been found extremely important to provide the necessary accuracy support and sliding adjustment for the probe to make sure that it does not change radial position within the line as it is being moved therealong.

A principal object of this invention therefore, is to provide an improved arrangement for determining the standing wave ratio on a high frequency wave transmission line, while using a fixed radio frequency probe.

A feature of the invention relates to an arrangement employing a pair of devices for simultaneously changing, but in opposite senses, the effective electrical length of a wave transmission line, in conjunction with a radio frequency probe located between the devices, for determining the standing wave ratio on the line.

Another feature relates to a novel device for controlling the electrical length of a wave transmission line without changing its physical length.

A further feature relates to the novel combination of a pair of devices forming part of a wave transmission line for matching the impedance of a radio frequency generator and a radio frequency load to the line impedance, without changing the physical length of the line.

A further feature relates to an improved arrangement for insuring constant power input to a radio frequency system from an oscillator, which oscillator is coupled to the system without the intervention of a buffer stage or stages.

A further feature relates to a novel "line stretcher" for continuously adjusting the electrical length of a line of the coaxial type.

Another feature relates to a radio frequency probing arrangement for wave transmission lines, which arrangement does not require expensive and complicated slotted line sections.

A still further feature relates to the novel organization, arrangement, and relative interconnection of parts which cooperate to provide an improved standing wave ratio measuring system.

Other features and advantages not particularly enumerated, will be apparent after a consideration of the following detailed description and the appended claims.

Figure 1:
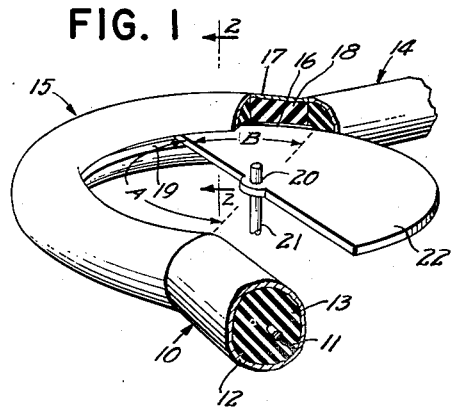
Fig. 1 is a perspective and partly sectional view of an impedance adjusting device according to one feature of the invention.
Figure 2:
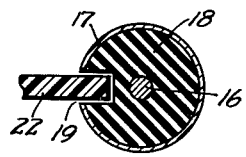
Fig. 2 is a sectional view of Fig. 1, taken along the line 2—2 thereof.

Referring to Fig. 1, the numeral 10 represents a section of a wave transmission line of the coaxial type, comprising a center conductor 11 which is surrounded by a tubular or outer metal conductor 12. The conductor 11 is maintained in fixed position along the axis of conductor 12 by means of any suitable insulating filling or spacer 13. The numeral 14 also represents a similar section of coaxial line. In order to control the impedance and electrical length of the coaxial line, there is interposed between the sections 10 and 14, another section 15 consisting of the center conductor 16 and the outer tubular conductor 17, with the usual filling of insulation 18 between the two conductors. The section 15 is, in accordance with one feature of the invention, bent or shaped to a semi-circular configuration, and the outer conductor 17 and the cooperating insulation filling 18 are cut away to provide a milled slot 19. This slot may extend in radial depth all the way to the inner conductor 16, but preferably it is shorter in depth than the radius of the member 17, so that the center conductor 16 remains unexposed. Suitably mounted on the axis of curvature 20 of the section 15, is a rotary shaft 21 which carries a semi-circular disc 22 of dielectric material. The disc 22 is mounted on shaft 21, so that it is in alignment with the slot 19, and the disc radius is chosen so that the disc projects into the slot 19. The thickness of the disc 22 is slightly less than the width of slot 19, so as to permit the said disc to be freely rotated with its margin located within the said notch so as to overlap the dielectric 18. Thus the disc 22 can be positioned in any angular orientation between zero and 180 degrees to correspondingly vary the extent of circumferential overlap between the disc 22 and the notch 19. From the well-known theory of coaxial wave transmission lines, the electrical length of the transmission line section 15 will therefore be a function of the angular orientation of the disc 22 with respect to the slot 19. In other words, the slot 19 may be considered as made up of two dielectric sections along its arcuate length, namely the section A comprised of air dielectric, and the section B comprised mainly of the dielectric 22. There is thus provided a relatively simple arrangement for varying the effective electrical length of the coaxial line. It will be understood, of course, that the device 15 instead of being a separate unit attached to the coaxial line sections 10 and 14, may be integral with the coaxial line. Thus the conventional coaxial line may have a portion of its length bent to semi-circular shape, and the inner margin of the curved section can be provided with a slot similar to slot 19, so as to receive the rotatable insulating or dielectric disc 22.

By using a pair of devices, each device comprising a coaxial line section 15 and a cooperating rotatable dielectric disc, it is possible to determine the standing-wave-ratio on a transmission line without using the conventional sliding pick-up probe. Thus, referring to Fig. 3, the numeral 23 represents any well-known source of ultra high frequency oscillations which are to be connected to any suitable radio frequency load 24 by means of a wave transmission line 25 which may be of the wave guide or coaxial conductor type. Inserted at any convenient point in the line 25, is a line stretching device 26 which is similar to the device of Fig. 1, and accordingly the corresponding parts of devices 15 and 26 are designated alike.

Also inserted in the line 25, is another line stretching device 27 similar to the device 15 of Fig. 1. The parts of device 27 which correspond to those of device 15 are designated by the same numeral primed. It will be observed, however, that the devices 26 and 27 have their dielectric discs 22, 22', interconnected by a common operating shaft 28 and provided with a common adjusting knob or calibrated dial 29. However the devices 26 and 27 are so mounted that as the shaft 28 is turned counter-clockwise, the extent of circumferential overlap between disc 22 and the slot 19 continuously increases, while the extent of circumferential overlap between the dielectric disc 22' and the slot 19' simultaneously decreases. If, therefore, the devices 26 and 27 have the same curvature, when one disc, for example disc 22, increases its overlap with its slot 19, the other disc 22' equally decreases its circumferential overlap with its slot 19'. The devices 26 and 27 are connected together by the section 30 of the line 25. The section 30 has located mid-way between its ends a radio frequency probe 31 which is connected to any well-known radio frequency detector and indicator 32. Merely by turning the knob 29 and observing the indicator 32, the voltage standing-wave-ratio on the line 25 can be directly determined, and since the devices 26 and 27 vary the electrical length of the line 25 simultaneously in opposite senses, the standing-wave-ratio can be determined without altering the amount of power delivered by the generator 23 to the load 24.

Figure 3:
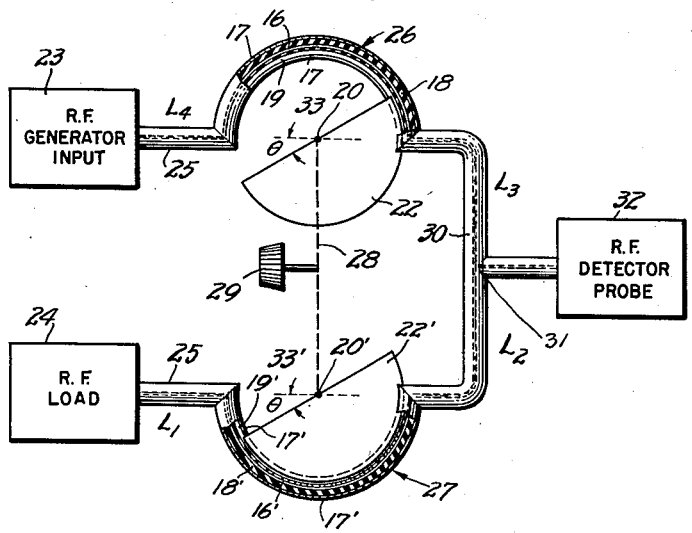
Fig. 3 shows a system employing a pair of devices such as shown in Fig. 1, and forming part of a wave transmission line for measuring standing wave ratios on said line.
Figure 4:
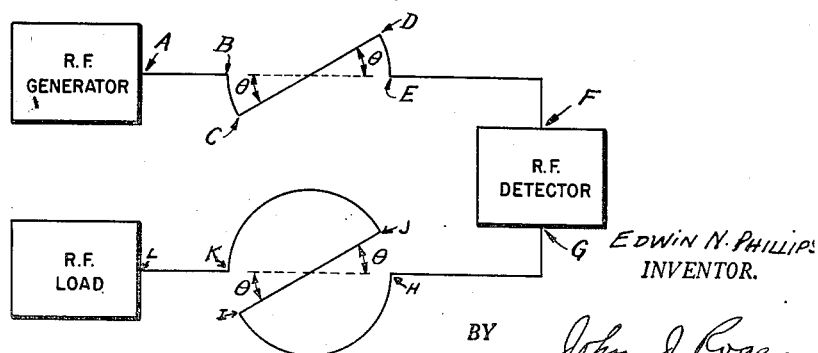
Fig. 4 is a generalized schematic illustration explanatory of the operation of Fig. 3.

In order to understand more clearly the action of the arrangement of Fig. 3, it is illustrated schematically in Fig. 4 of the drawing. In Fig. 4, as in Fig. 3, the angle $\theta$ represents the angular orientation between the straight edges of the discs 22, 22', and the respective fixed diameters 33, 33'. Merely for simplicity in explanation, the electrical lengths of the transmission paths are represented in Fig. 4 by single lines. The arrows along these lines in Fig. 4 will then represent the flow of radio frequency energy from the generator to the load. The distance from the point of connection of the load to the detector and the point of connection of the generator to the detector is as follows:

$$LK + KJ + JI + IH + HG \quad (1)$$

but the distances KJ and IH are equal to each other and to $$\frac{180° - \theta°}{360°} \pi d \quad (2)$$

where $d$ is the diameter of the arcuate portion of the stretcher, and measures the lengths CD and IJ. Thus, the distance separating load and detector is $$LK + \frac{180° - \theta°}{360°} \pi d + d + \frac{180° - \theta°}{360°} \pi d + HG \quad (3)$$

or $$(LK + d + HG) + 2\frac{180° - \theta°}{360°} \pi d \quad (4)$$

or $$(LK + d + HG) + \frac{180° - \theta°}{180°} \pi d \quad (5)$$

or $$(LK + d + HG + \pi d) - \frac{\theta°}{180°} \pi d \quad (6)$$

The bracketed quantity is a constant; the latter term can vary between the physical limits of $\theta°$ equal to zero (corresponding to an additional transmission path length of zero) and $\theta°$ equal to 180° (corresponding to an additional transmission path length of $\pi d$) so that the diameter of the stretcher is fixed. For example, if it is desired to note only a maximum and a minimum, this distance corresponds to $\lambda'/4$ where $\lambda'$ is the wavelength in the medium of which the stretcher is composed, and so $$\pi d = \lambda'/4 \quad (7)$$

or $$d = \lambda'/4\pi \quad (8)$$

where both $d$ and $\lambda'$ are measured in the same length units. Again, if it is desired to see $\eta$ cycles of standing-wave-pattern (for oscilloscopic presentation, possibly), then $$\pi d = \eta \lambda'/2 \quad (9)$$

or $$d = \eta \lambda'/2\pi \quad (10)$$

The path length from generator to load is composed of the distance already given $$(LK + d + HG + \pi d) - \frac{\theta°}{180°} \pi d \quad (11)$$

plus the additional distances $$FE+ED+DC+CB+BA \qquad (12)$$

But the distances ED and CB are equal to each other and to $$\frac{\theta°}{360°}\pi d \qquad (13)$$

so that the distance from detector to generator is given by $$FE+\frac{\theta°}{360°}\pi d+d+\frac{\theta°}{360°}\pi d+BA \qquad (14)$$

or $$(FE+d+BA)+2\frac{\theta°}{360°}\pi d \qquad (15)$$

or $$(FE+d+BA)+\frac{\theta°}{180°}\pi d \qquad (16)$$

and thus the total distance between load and generator is $$(LK+d+HG+\pi d)-\frac{\theta°}{180°}\pi d+$$
$$(FE+d+BA)+\frac{\theta°}{180°}\pi d \qquad (17)$$

or $$LK+d+HG+\pi d+FE+d+BA \qquad (18)$$

which is seen to be independent of the angular disposition $\theta$ of the rotary arms, and so, is constant.

Likewise, in connection with the coaxial line system shown in Fig. 3, it can be shown that the total length of transmission line between the load and generator is $$L_1+\frac{\theta°}{360°}\pi d\sqrt{K}+\frac{180°-\theta°}{360°}\pi d\sqrt{K_1}+L_2+L_3+$$
$$\frac{\theta°}{360°}\pi d\sqrt{K_1}+\frac{180°-\theta°}{360°}\pi d\sqrt{K_1}+L_4 \qquad (19)$$

or $$L_1+L_2+L_3+L_4+(\sqrt{K}+\sqrt{K_1})\frac{\pi d}{2} \qquad (20)$$

wherein

K equals the dielectric constant of the slot 19 when the cooperating disc is entirely out of the slot;
$K_1$ equals the dielectric constant of the slot when the disc is overlapped partially or completely therewith;
$L_1$ equals the length of coaxial line between the load 24 and the device 27;
$L_4$ equals the length of coaxial line between the device 26 and the generator;
$L_3$ equals the length of coaxial line between the device 26 and the probe 31;
$L_2$ equals the length of coaxial line between the probe 31 and the device 27; and
$d$ equals the diameter of each of the discs.

Thus the length of the line between the generator 23 and the load 24 is independent of the setting of shaft 28.

If a single line stretcher were employed as distinguished from a pair of serially connected line stretchers, as illustrated in Figs. 3 and 4, the single stretcher would cause a constant load to present an input impedance which varies cyclically between certain limits. For a load mismatched to the transmission system by a voltage standing-wave-ratio $\rho$, this single stretcher would show to the generator an input impedance which would vary between extreme values of $Z_0\rho$ and $Z_0/\rho$, wherein $Z_0$ is the surge impedance of the transmission line system in ohms. The power delivered by the generator to the transmission system, and the power abstracted from that system by the load, would then vary between limits determined by the respective impedance mis-matches at these junctions. By using two line stretchers in series as above described and illustrated, variation in the line length is eliminated, thus insuring that a constant power flows through the transmission system while, at the same time, a continuous probing of the system for voltage standing-wave-ratio is possible.

It will be understood, of course, that the simultaneous rotation of the discs 22 and 22' can be effected manually, and by reading the output of the detector indicator 32, there are sufficient data for determining the electrical characteristics of the load. However, if desired, the shaft 28 can be rotated at a predetermined rate by a continuously running motor, and the output of the detector 32 can be applied to a cathode-ray oscilloscope, or the like, to produce a visual indication of the standing-wave-ratio.

Figure 5:
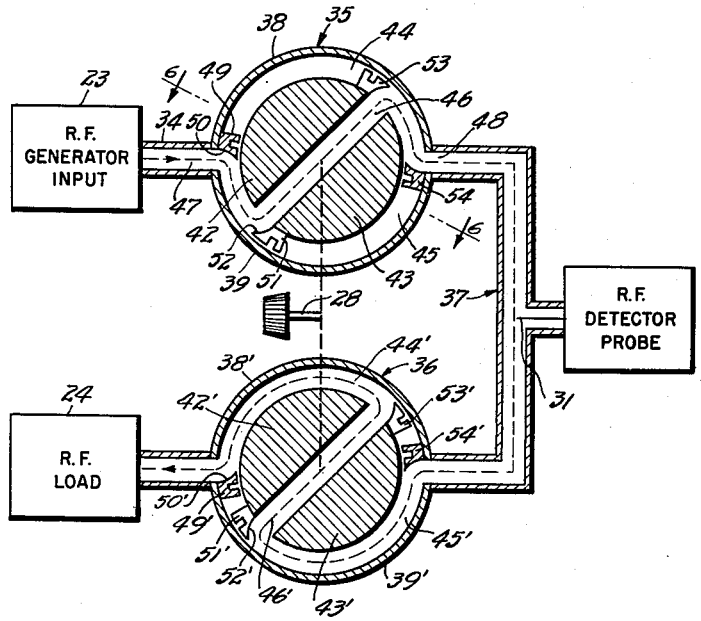
Fig. 5 is a modification of Fig. 4.
Figure 6:
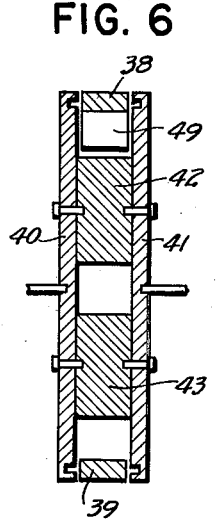
Fig. 6 is a sectional view of Fig. 5, taken along the line 6—6 thereof.

The invention is not limited to a wave transmission system of the coaxial line type, and is also useful in systems of the wave guide type. Thus, as shown in Fig. 5, the radio frequency generator 23 is coupled to the radio frequency load 24 by a wave guide 34, which, for example, may be rectangular in cross-section. A pair of oppositely adjustable line stretchers 35, 36, of the wave guide type, are connected in series in the transmission line between the generator and load, and the fixed radio frequency probe 31 is inserted into the wave guide section 37 which interconnects the stretchers 35, 36, in series. The stretcher 35 may consist of two semi-circular metal plates 38, 39, which are respectively joined to the corresponding side walls of the wave guides 34 and 37. A pair of flat circular plates 40, 41, each carrying a respective integrally attached semi-circular metal block 42, 43, forms with the members 38, 39, an annular wave guide having two semi-circular sections 44, 45, and a communicating diametrical section 46. The rotor assembly consisting of the plates 40, 41, and the blocks 42, 43, is arranged to be rotated to change the angular orientation of the diametrical guide portion 46 with respect to the inlet and outlet openings 47, 48, of the wave guide. Mounted adjacent the inlet opening 47 is a wave reflector 49 having a suitably curved face 50 to cause the waves to be reflected in the direction of the dotted line. A corresponding wave reflector 51 is attached to block 43, and has a complementary curved surface 52 which likewise reflects the waves through the diametrical wave guide section 46. Likewise the block 42 carries a similar wave reflector 53 having a curved reflecting surface for reflecting the waves along the dotted line path. Similarly, a wave reflector 54 is attached to the outlet opening 48. It will be understood, of course, that the plates 40 and 41 are slightly spaced from the blocks 42, 43, as shown in Fig. 6, so as to prevent direct current short-circuiting, while providing an effective continuity to the wave guide, and this spacing is chosen so as to prevent leakage of the wave guide energy externally of the guide, as is well-known in the wave guide art. Consequently, as the rotor of device 35 is turned in a clockwise direction, it causes a decrease in the length of the wave guide path between the openings 47 and 48, and when it is turned in a counter-clockwise direction, it increases the length of the said wave guide path. The device 36 is similar to the device 35, and the corresponding parts are designated by the same numerals, but primed. The essential difference between the two units is that the reflectors 49′, 51′, 53′ and 54′ are located, as shown in Fig. 5, so that when the rotor blocks 42′, 43′ are rotated in a clockwise direction, they increase the length of the wave guide path, and when they are rotated in the counter-clockwise direction, they decrease the length of the wave guide path. It will be understood, of course, that the rotors of the two units 35 and 36 are ganged together for operation from the common shaft 28, as already described in connection with Fig. 3.

Figure 7:
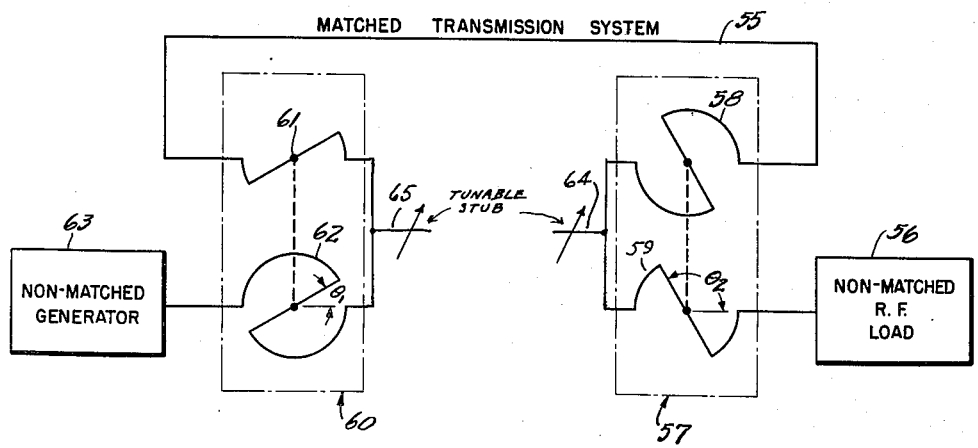
Fig. 7 is a further modification of the invention.

Fig. 7 shows a further modification of the invention for matching a normally non-matched radio frequency generator and a normally non-matched radio frequency load to a wave transmission system. Interconnected between one end of the main transmission line 55 and the non-matched load 56, is a duplex line stretcher unit 57 consisting of sections 58, 59, which may be similar to the sections 26, 27, of Fig. 3, if the line 55 is a coaxial line; or similar to the units 35, 36 (Fig. 5) if the line 55 is a wave guide. Another duplex line stretching unit 60 consisting of sections 61, 62, similar respectively to sections 59 and 58, is connected between the generator 63 and the line 55. Connected between the units 58 and 59, is a transmission line stub 64, or a dummy probe, or any similar wave reflecting obstacle. By this arrangement, the normally non-matched radio frequency load 56 is translated by the line stretcher section 59 until at a predetermined angular setting θ the translated load looks like a resistance equal to the surge impedance of the system. At this setting of section 59, there will, in general, also be a reactive component present in the translated load impedance. It is for this reason that the adjustable stud line 64 (or a dummy probe of adjustable insertion depth is provided in the wave guide) is introduced into the system between the sections 58 and 59 of the line stretcher. The reactance or susceptance of this stub line is adjusted until it is both equal and opposite to that presented by the translated load impedance. From that point on, looking towards the generator 63, the system is matched, that is it sees a non-reactive load whose resistance equals its own surge impedance. The section 58 of the line stretcher 57 thus functions merely to keep the length of the transmission path from the end of the main transmission line 55 to the load 56 at a constant value. The degree of match can be indicated by any conventional slotted line section or directional coupler or by an indicating system similar to that shown in Figs. 3, 4 or 5 of this disclosure inserted preferably into the system between the main transmission line 55 and the line stretcher 57.

At the load end of the system, maximum power will be delivered by the generator when it looks into its own impedance. Similarly, the line stretching unit 60 with the interconnected adjustable stub line 65, can be used to transform the input impedance of the transmission system to match it to the generator 63. It will be clear, therefore, that the system shown in Fig. 7, provides for the matching of any arbitrary load to the transmission system at any single frequency, and the matching of any generator to any high frequency transmission system at any single frequency.

Various changes and modifications may be made in the disclosed embodiments without departing from the spirit and scope of the invention.

What is claimed is:

1. Apparatus for controlling the impedance relations on a high frequency wave transmission line, comprising a pair of transmission line sections connected serially in the line, means including a single adjustable member to adjust simultaneously the effective length of said sections in opposite senses to maintain the total length of the line substantially unchanged, and a detector coupled to said line between said sections to determine the standing wave ratio on the line.

2. Apparatus for controlling the impedance relations on a high frequency wave transmission line, comprising a pair of transmission line sections connected serially in the line each of said line sections having an element to adjust its electrical length, means including a single adjustable member for simultaneously adjusting said elements in opposite senses while maintaining the total length of the line substantially unchanged, and a detector coupled to said line between said sections to determine the standing wave ratio on the line.

3. Apparatus for controlling the impedance relations on a high frequency wave transmission line, comprising a pair of coaxial line transmission sections each of said sections having a slot through the outer conductor thereof extending along the length of the section, a dielectric disc for each section each disc being movable to vary the portion of its length extending along said slot, and means to move said discs in opposite directions with respect to each other to maintain the electrical length of the line substantially unchanged.

4. Apparatus for controlling the impedance relations on a high frequency wave transmission line, comprising a pair of coaxial line sections each having a slot through its outer conductor, said line sections being curved to arcuate form, a dielectric disc for each line section arranged to enter the slot therein, and means to rotate said discs to cause one disc to increase the length thereof entering the slot in one line section while rotating the other disc to decrease the length thereof entering the slot in the other line section.

5. Apparatus according to claim 4, in which said line sections are curved to substantially semi-circular form, and each of said discs is substantially semi-circular.

6. A high frequency wave transmission line including in series in the line two substantially similar curved coaxial line sections, a first dielectric disc arranged to be rotated to vary the extent of its intercept with the dielectric in the first line section, a second dielectric disc adapted to be rotated to vary its extent of intercept with the dielectric in the second line section, and means for simultaneously rotating said discs to cause them to vary their said intercepts in opposite senses.

7. A high frequency wave transmission line, comprising a pair of line stretchers connected serially in the line each of said stretchers having an adjustable element for varying the length thereof, means including a single adjustable member mechanically coupled to said line stretchers to simultaneously adjust said elements so that as one stretcher increases its length, the other stretcher decreases its length, and a detector coupled to said line between said stretchers for determining the standing wave ratio on said line.

8. A high frequency wave transmission line according to claim 7, in which each of said line stretchers is of the coaxial line type.

9. A high frequency wave transmission line according to claim 7, in which each of said line stretchers is of the wave guide type.

10. In combination, a high frequency wave generator, a high frequency load circuit, a wave transmission line for connecting the generator to the load, and means to determine the standing-wave-ratio on said line, the last-mentioned means comprising a pair of line stretchers serially connected in said line each stretcher having a length adjusting element, means including a single adjustable member mechanically coupled to said adjusting elements to adjust said elements to vary simultaneously the respective lengths of said stretchers in opposite senses, and a radio frequency detector connected to said line between said stretchers.

11. In combination, a radio frequency generator, a radio frequency load, a wave transmission line for coupling said generator to said load, said line comprising a pair of line stretchers serially connected in the line, means including a single adjusting member mechanically coupled to said line stretchers to increase the length of one stretcher while simultaneously and equally decreasing the length of the other stretcher, a fixed high frequency probe connected to the junction between said stretchers, and an indicator device connected to said probe.

12. In combination, a radio frequency generator, a radio frequency load, a wave transmission line coupling said generator to said load, and means to determine the standing-wave-ratio on said line comprising a radio frequency pickup device coupled to said line, a first line stretcher connected in said line between said detector and said generator, a second line stretcher connected between said detector and said load, means to increase the electrical length of one stretcher, and means including a single adjusting member mechanically coupled to said line stretchers to simultaneously and equally decrease the length of the other stretcher.

13. In combination, a radio frequency generator, a radio frequency load, a wave transmission line coupling said generator to said load, a radio frequency probe for said line, and means to determine the standing-wave-ratio on said line without moving said probe with respect to said line, the last-mentioned means comprising a first line stretcher connected between said probe and said generator said first line stretcher comprising a length of coaxial transmission line having a slot in its outer conductor extending along the length thereof, an adjustably mounted dielectric disc cooperating with said slot to progressively change the dielectric constant of said line section, a second line stretcher of the coaxial line type connected between said probe and said load, said second line stretcher having a slot in the outer conductor thereof extending along the length of the section, another adjustably mounted dielectric disc arranged to register with the slot in the said second line stretcher to progressively change the dielectric constant of said second line stretcher equally and opposite to the change in dielectric constant of the first stretcher.

14. In combination, a high frequency generator, a high frequency load, a wave transmission line for coupling said generator to said load, a duplex line stretcher connecting the generator to the input end of said line, a second duplex line stretcher connecting the output end of said line to said load, each line stretcher including a pair of elements one of which increases the line length while the other simultaneously and equally decreases the line length, all of said elements being connected in series in said line, impedance adjusting means connected between the two elements of the first duplex line stretcher, and other impedance adjusting means connected between the two elements of the second line stretcher.

15. The combination according to claim 14, in which each of said line stretchers is of the coaxial line type.

16. The combination according to claim 14, in which each of said line stretchers is of the wave guide type.

EDWIN N. PHILLIPS.

REFERENCES CITED

The following references are of record in the file of this patent:

UNITED STATES PATENTS

| Number | Name | Date |
|---|---|---|
| 2,400,597 | Peterson | May 21, 1946 |
| 2,403,289 | Korman | July 2, 1946 |
| 2,404,399 | Pickles | July 23, 1946 |
| 2,502,359 | Wheeler | Mar. 28, 1950 |

OTHER REFERENCES

"Electronics" Magazine, January 1947, pages 96–99, article entitled "Standing Wave Meter" by Kallman.